(12) United States Patent
Uhlemann

(10) Patent No.: US 8,977,734 B2
(45) Date of Patent: *Mar. 10, 2015

(54) METHOD AND APPARATUS FOR TRANSMITTING DATA

(75) Inventor: Stefan Uhlemann, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 572 days.

This patent is subject to a terminal disclaimer.

(21) Appl. No.: 13/198,677

(22) Filed: Aug. 4, 2011

(65) Prior Publication Data

US 2011/0289379 A1  Nov. 24, 2011

Related U.S. Application Data

(63) Continuation of application No. 11/641,316, filed on Dec. 19, 2006, now Pat. No. 8,005,977.

(30) Foreign Application Priority Data

Dec. 20, 2005  (DE) .................. 10 2005 060 968

(51) Int. Cl.
*H04M 11/06* (2006.01)
*H04L 29/06* (2006.01)
*H04L 12/70* (2013.01)

(52) U.S. Cl.
CPC .............. *H04M 11/062* (2013.01); *H04L 69/18* (2013.01); *H04L 47/00* (2013.01)
USPC ....................................................... 709/223

(58) Field of Classification Search
CPC .... H04M 11/06; H04M 11/062; H04L 47/00; H04L 69/18
USPC .................................................. 709/223, 230
See application file for complete search history.

(56) References Cited

U.S. PATENT DOCUMENTS 8,005,977 B2 *  8/2011  Uhlemann .................. 709/233

* cited by examiner

*Primary Examiner* — Kristie Shingles

(57) ABSTRACT

In a method for transmitting data of various traffic types an xDSL modem is utilized. Detectors are used to detect the traffic types of the data which are to be transmitted and the detected traffic types are taken as a basis for dynamically adjusting a data transmission rate for the xDSL modem.

19 Claims, 9 Drawing Sheets

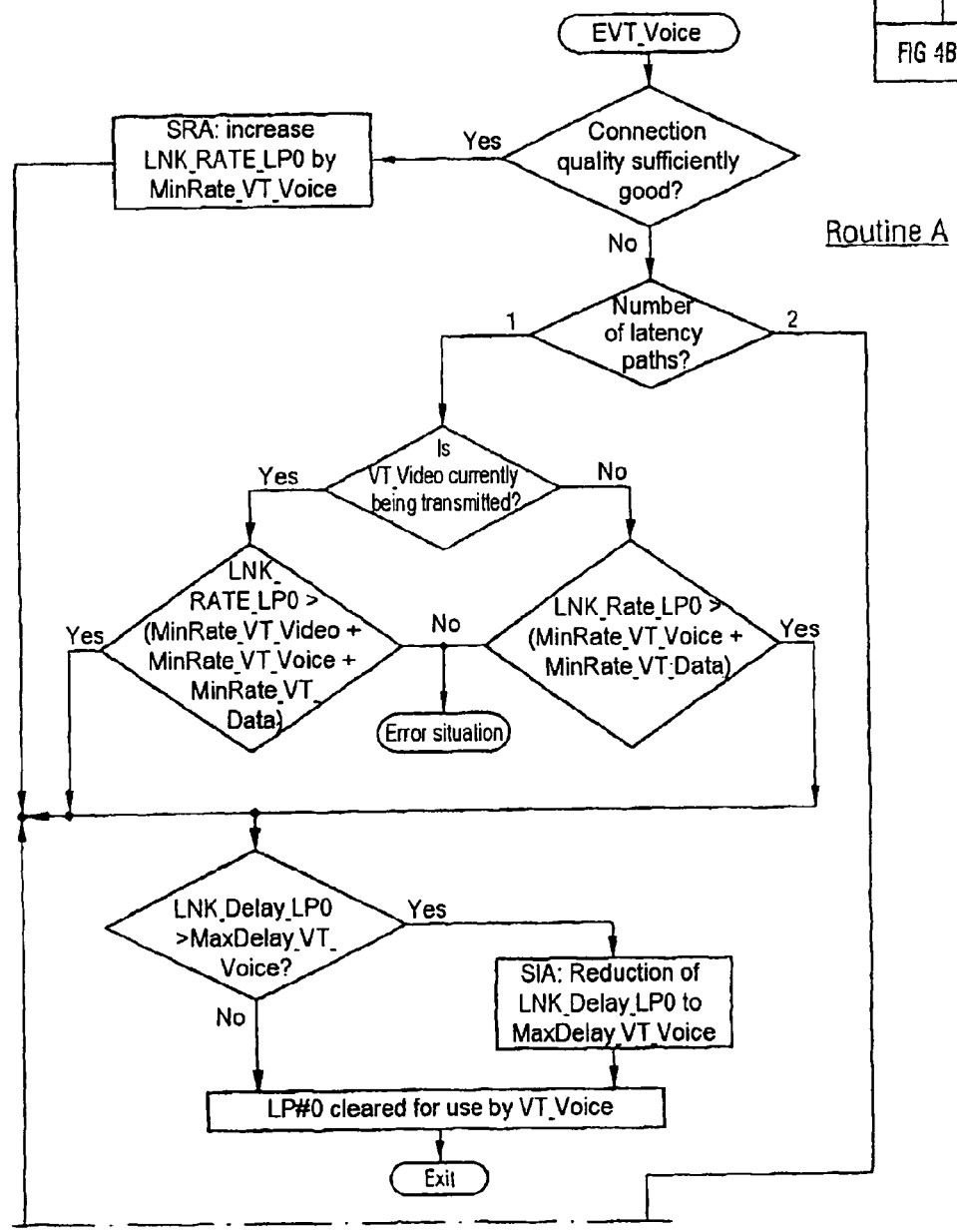

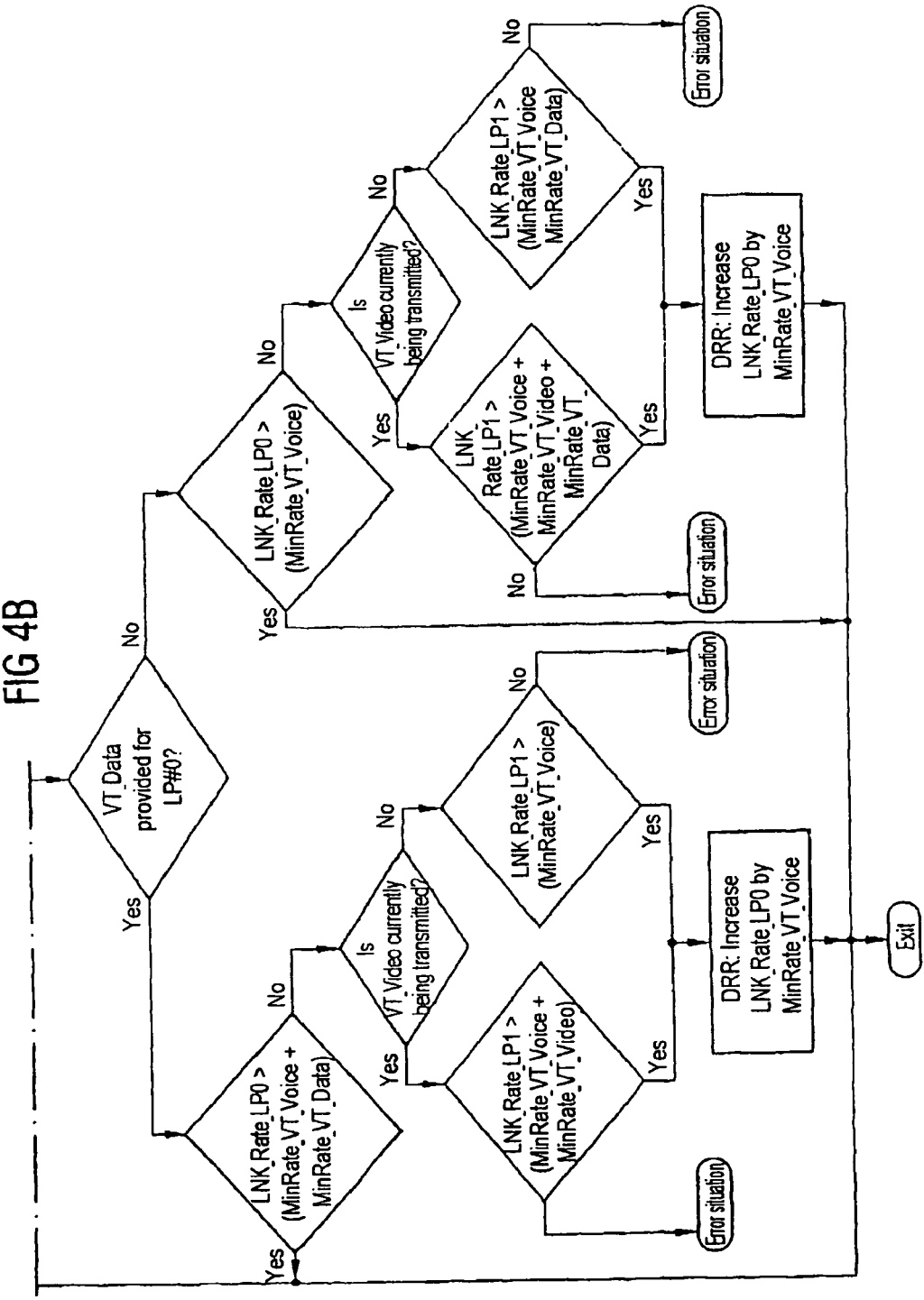

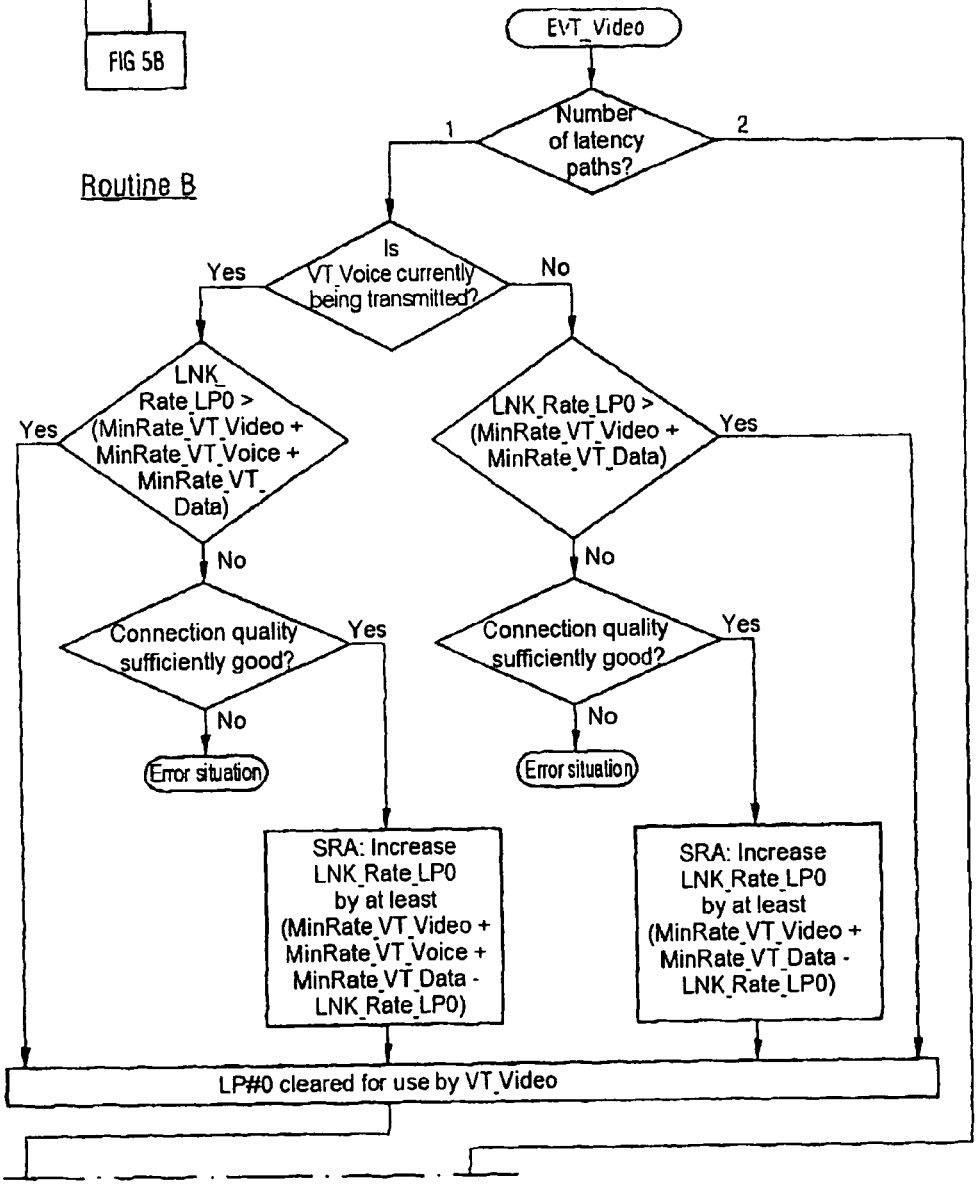

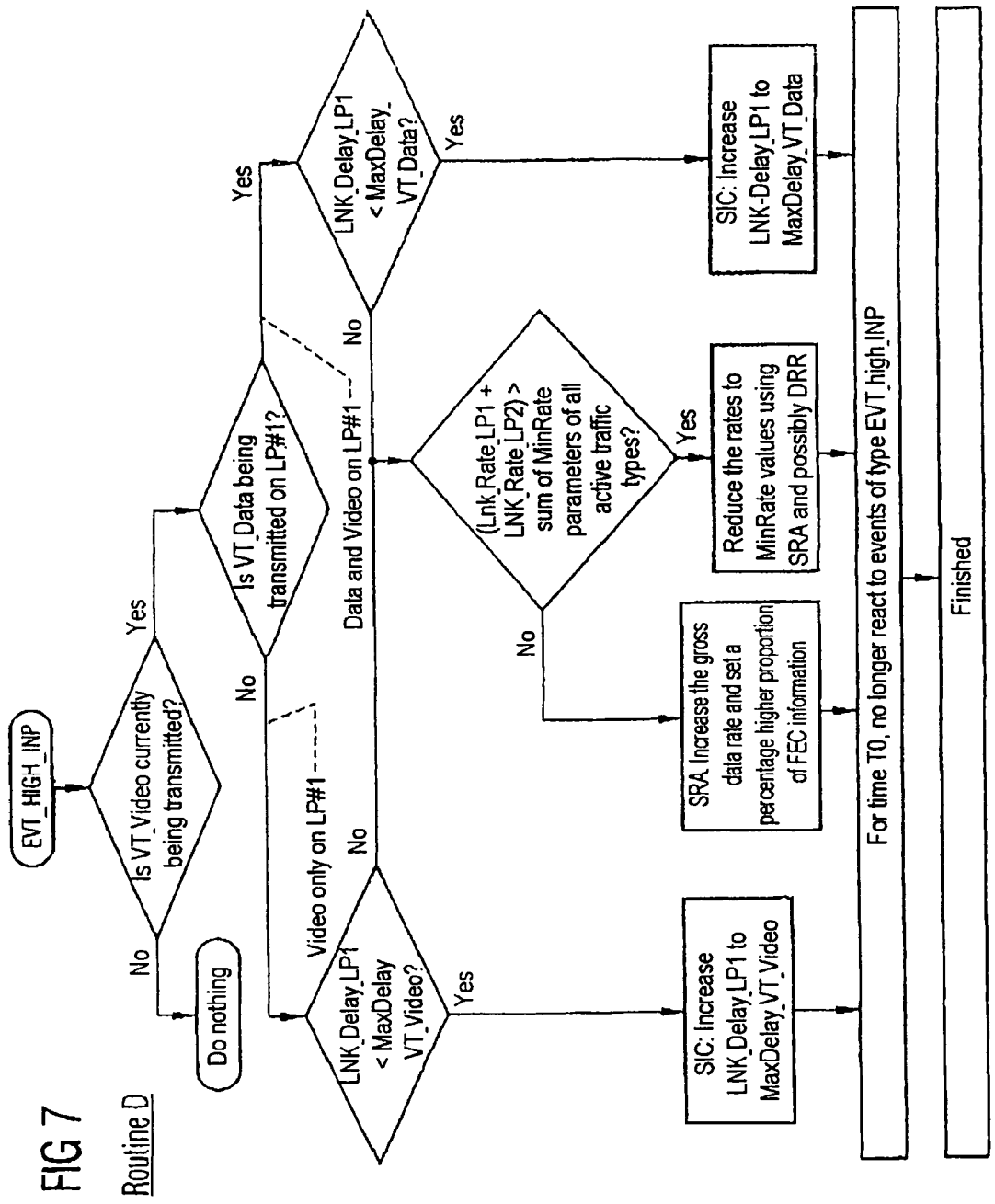

METHOD AND APPARATUS FOR TRANSMITTING DATA

RELATED APPLICATIONS

This Application is a Continuation Application of U.S. patent application Ser. No. 11/641,316 filed on Dec. 19, 2006 now U.S. Pat. No. 8,005,977. U.S. patent application Ser. No. 11/641,316 claims priority benefit of Germany Patent Application 102005060968.6, which was filed on Dec. 20, 2005. The entire contents of U.S. and German filed Applications are incorporated herein by reference.

BACKGROUND OF THE INVENTION

The invention relates to a method and an apparatus for transmitting data.

xDSL methods (DSL: Digital Subscriber Line) are transmission-related methods for the digital use of twisted pairs of telephone wires in a subscriber access network. The subscriber access network is a network to which a multiplicity of subscribers are connected by means of a respective telephone line. In the case of xDSL, a distinction is drawn between symmetrical and asymmetrical xDSL variants. In the case of the asymmetrical ADSL, the data transmission rates downstream, i.e. towards the subscriber, at up to 8 MB/sec., are much higher than the data transmission rate of 1 MB/sec. which can be achieved upstream. In most households, Internet access via the existing copper pairs is used. The continually rising need for bandwidth also means that what is known as VDSL (Very High Speed Digital Subscriber Line, ITU-T Standard G.993.1 G.993.2) technology is also being introduced in steps, this technology allowing data rates of up to 100 MB/sec. to be achieved in both directions on short lines.

The attainable data rates are dependent on the signal-to-noise ratio SNR on the respective telephone line. As the line length increases and as the crosstalk from other telephone line pairs increases, the data rate which can actually be attained decreases. The current practice of a network operator for configuration during operation of a DSL line is for the customer or subscriber to have a fixed data rate agreed for his Internet access which is significantly below the physically achievable data transmission rate. This agreed low fixed data transmission rate is also still achieved on longer telephone lines, even if disturbing adjacent DSL signals occur. Alternatively, network operators guarantee a minimum data transmission rate and then set a possibly higher possible data transmission rate on the basis of the actual line conditions when clearing the DSL line (Best Effort).

It is becoming increasingly important for DSL network operators to provide voice services (Voice Over IP) and films (Video On Demand) using DSL in future. This significantly increases the need for bandwidth. Transmitting voice data using Voice Over IP and transmitting image data make special demands on the DSL connection. Voice data have a low data transmission rate of below 100 KB/sec. but are particularly sensitive to a long signal propagation time or signal propagation time fluctuations, since these mean that signal components reflected at the far end of the subscriber line are perceived by the subscribers as an irritating echo. Merely a total propagation time of above 30 msec. reduces the subjective quality of the telephone call. A DSL voice link should therefore ideally not contribute more than 5 msec. to the total propagation time.

Video or image data use image compression techniques which result in a data transmission rate of between 2 MB/sec. and 20 MB/sec. The real-time character of the video data stream does not allow the repeated transmission of data packets which have been lost, as is customary with the TCP protocol, for example (TCP Over IP). If RTP data packets (RTP: Real Time Protocol) are lost, this results in brief picture noise. Retransmission of lost data packets for image data transmission is possible only if a sufficiently large buffer store is provided at the receiver end which can compensate for the time loss in the event of a fresh packet request. However, a large buffer store has the drawback that a change of channel or a change of program results in long idle times when emptying or refilling the buffer store, or else a very large bandwidth needs to be provided on the DSL line which is significantly higher than the ascertained data rate required for transmitting a single video data stream.

Impulse noise occurring on a DSL connection can result in a brief loss of data. For pure Internet data, such as web data, or e-mail data, such data losses caused by impulse noise are totally unnoticeable to the subscriber thanks to TCP retransmission, i.e. fresh transmission of data. Even when voice data are being transmitted, impulse noise merely causes an audible noise, but this is barely perceived by the subscribers.

Both ADSL and VDSL are equipped with an error correction mechanism where the transmitter adds redundant data to the data stream which allow a particular volume of noisy data to be reconstructed at the reception end. This error correction allows bit errors caused by impulse noise to be corrected. In this case, bit errors when pulsed noise signals occur are avoided by distributing the bit information over the DSL connection in the course of time, or "interleaving" it. Without interleaving, a pulsed noise signal can disturb both the actual useful data and the redundantly added error correction data. However, interleaving the data results in an additional signal propagation time which is typically between 80 and 20 msec. in order to provide adequate protection against pulsed noise signals. Pulsed noise signals normally have a duration of less than 0.5 msec. During the occurrence of a pulsed noise signal, the data contained in the data stream are completely destroyed. The longer signal propagation times caused by interleaving can be accepted without any drawbacks for video or image data. By contrast, longer signal propagation times caused by interleaving have a disruptive effect when transmitting voice data and possibly also when transmitting Internet traffic where timing is critical, for example "online gambling".

Generally, the various traffic types of data, particularly Internet data, voice data and video data, place partly conflicting demands on the configuration of the DSL connection and hence of the xDSL modem.

BRIEF SUMMARY OF THE INVENTION

The invention provides a method for transmitting data of various traffic types using an xDSL modem, wherein detectors are used to detect the traffic types of the data which are to be transmitted and the detected traffic types are taken as a basis for dynamically adjusting a data transmission rate for the xDSL modem, with framing and interleaving preferably also being adjusted.

In one embodiment of the inventive method for transmitting data of various traffic types using an xDSL modem, the following steps may be carried out:
a data transmission rate for the xDSL modem is initialized to a prescribed minimum transmission rate for transmitting data of a data traffic type;
it is detected whether data of at least one other traffic type need to be transmitted by the xDSL modem, and the data transmission rate is set to a prescribed minimum total data rate for transmitting data of the data traffic type and data of the further detected traffic types; the set data transmission rate is increased in steps at prescribed intervals of time; and the set data transmission rate is reduced to the minimum total data rate if a deterioration in connection quality is detected.

In one embodiment of the inventive method, the various traffic types may comprise a data traffic type for transmitting information data, particularly Internet data, a voice traffic type for transmitting voice data and a video traffic type for transmitting image data.

In this case, the data transmission rate of the xDSL modem may be set by a flow controller using SRA (Seamless Rate Adaptation).

In one embodiment of the inventive method, a voice data detector connected to the flow controller may be used to detect whether the data packets coming from a data source contain voice data.

In one embodiment of the inventive method, a video data detector connected to the flow controller may be used to detect whether the data packets coming from a data source contain image data.

In one embodiment of the inventive method, the data to be transmitted may be distributed over various transmitted-signal paths for the xDSL modem by a time-division multiplexer.

In one embodiment of the inventive method, the distributed data in each transmitted-signal path may be grouped by a framer to form an xDSL data transmission frame.

In one embodiment of the inventive method, the data to be transmitted in the xDSL data frame in each transmitted-signal path of the xDSL modem may be encoded by an associated error protection unit in order to protect against transmission noise.

In one embodiment of the inventive method, a test digit for each xDSL data transmission frame which is to be transmitted may be generated by means of a CRC (Cyclic Redundancy Check) encoder.

In one embodiment of the inventive method, the data to be transmitted, including the generated test digit, may be scrambled by a scrambler in the error protection unit.

In one embodiment of the inventive method, the scrambled data may be encoded by a Reed-Solomon encoder in the error protection unit.

In one embodiment of the inventive method, the data encoded by the error protection unit may be interleaved by a downstream interleaver contained in the transmitted-signal path which has an adjustable interleave depth.

In one embodiment of the inventive method, the signal propagation time of the various transmitted-signal paths of the xDSL modem may be set by altering the interleave depth of the associated interleaver for the various traffic types.

In one embodiment of the inventive method, the occurrence of impulse noise may prompt the signal propagation time to be set to maximum if a video data detector detects that the data packets coming from the data source contain image data.

The invention also provides an apparatus for transmitting data of various traffic types using an xDSL modem, wherein detectors can be used to detect the traffic types of the data which are to be transmitted, and the detected traffic types can be taken as a basis for dynamically adjusting a data transmission rate for the xDSL modem.

DETAILED DESCRIPTION OF THE SEVERAL VIEWS OF THE DRAWINGS

To explain features which are fundamental to the invention, the text below describes preferred embodiments of the inventive method and of the inventive flow controller for transmitting data of various traffic types using an xDSL modem with reference to the appended figures, in which:

FIG. 4 is a flowchart of a subroutine within the inventive method shown in FIG. 3.

FIG. 7 is a flowchart of a further subroutine within the inventive method shown in FIG. 3.

BRIEF DESCRIPTION OF THE INVENTION

Figure 1:
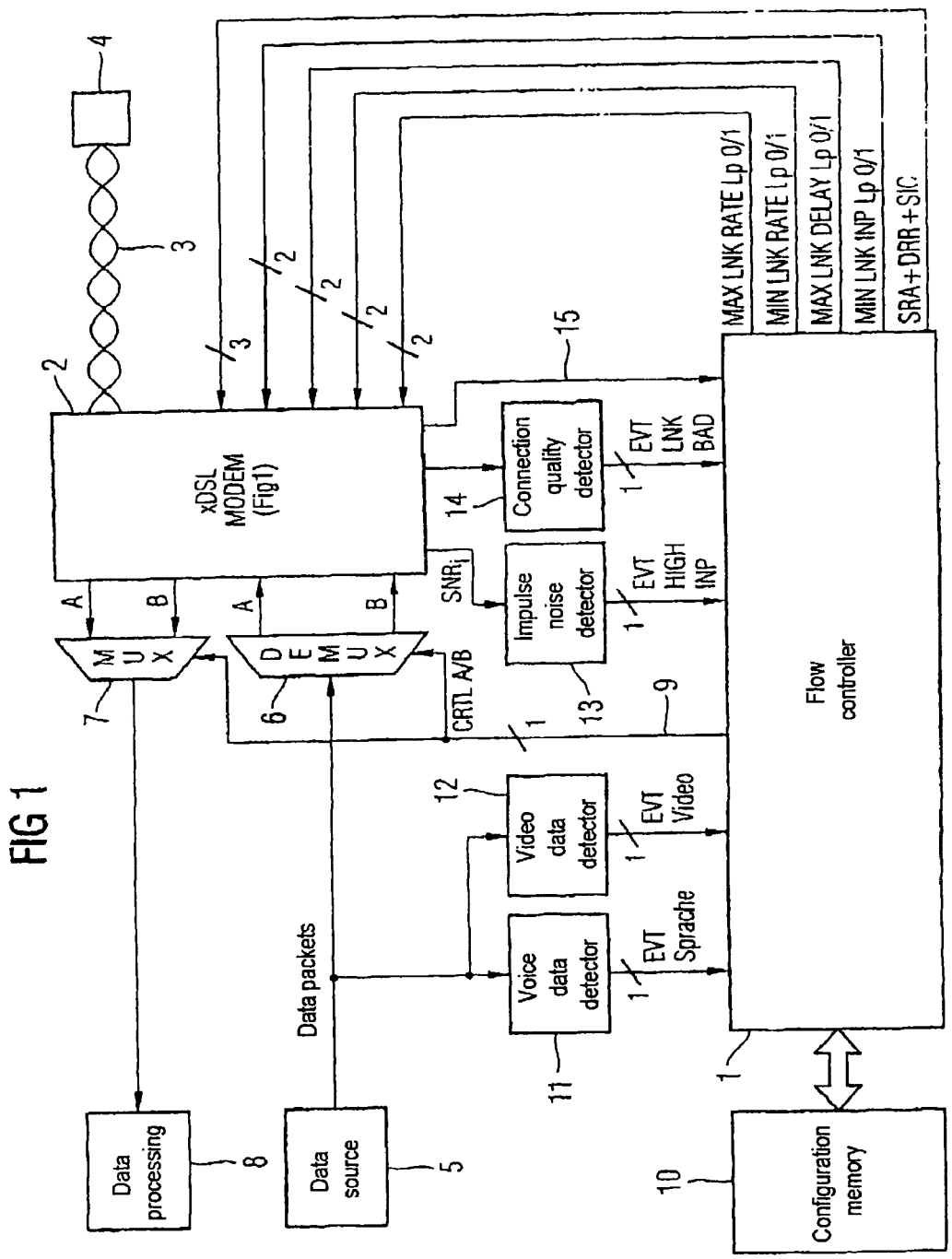
FIG. 1 is a circuit arrangement with an xDSL modem and an inventive flow controller.
Figure 2:
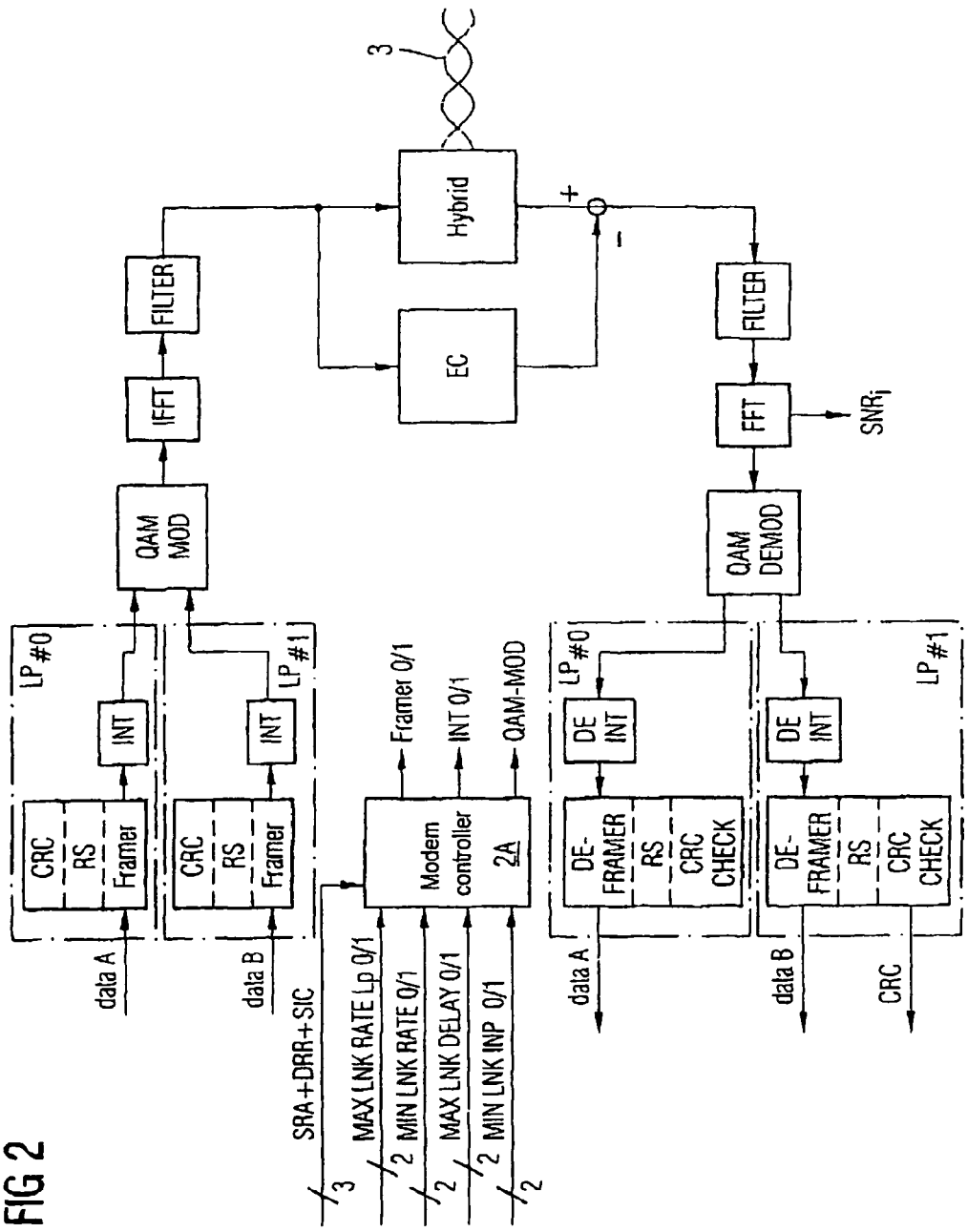
FIG. 2 is a block diagram of an exemplary embodiment of the xDSL modem actuated by the inventive flow controller.
Figure 3:
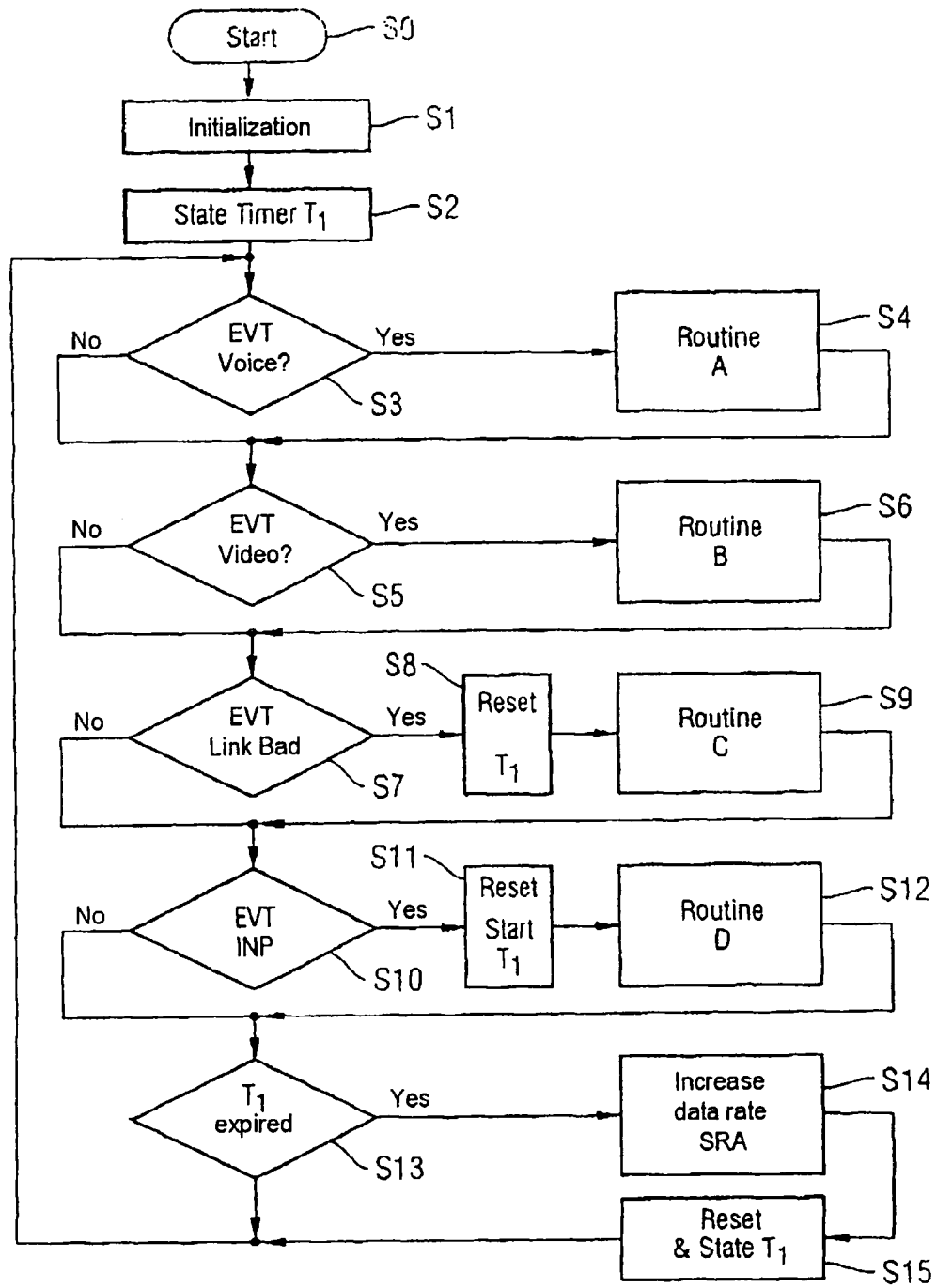
FIG. 3 is a flowchart of exemplary embodiment of the inventive method for transmitting data of various traffic types.

FIG. 1 shows a preferred embodiment of the inventive flow controller 1 for carrying out the inventive method, shown in FIG. 3, for transmitting data of various traffic types using an xDSL modem 2. The preferred embodiment of the xDSL modem used in this case is shown in FIG. 2. The xDSL modem 2 has a subscriber access point 4 connected to it by means of a subscriber line 3. The xDSL modem 2 sends and receives modulated data via the subscriber line 3.

The xDSL modem shown in FIG. 2 is a dual latency xDSL modem having two transmitted-signal paths and two received-signal paths whose interleavers have an adjustable interleave depth.

Data packets coming from an arbitrary data source 5 are distributed by a demultiplexer 6 over the two latency paths LP or transmitted-signal paths of the xDSL modem shown in FIG. 2. Conversely, the data received in the two received-signal paths are combined by a controlled multiplexer 7 and are supplied to an arbitrary data processing unit 8. The demultiplexer 6 and the multiplexer 7 are actuated by a flow controller 1 via a control line 9. The flow controller 1 selects one of the two latency paths of the dual latency xDSL modem 2. The flow controller 1 preferably has a configuration memory 10 connected to it on which various configuration parameters prescribed by the network operator are set. The flow controller 1 based on the invention uses a standard control interface comprising a plurality of control lines to actuate the dual latency xDSL modem 2.

The xDSL modem 2 shown in FIG. 1 is on a linecard or subscriber line driver card or in what is known as a DSLAM (Digital Subscriber Line Access Multiplexer), for example. The xDSL modem 2 is formed by an integrated semiconductor circuit, for example, and has interfaces based on various standards.

The flow controller 1 is connected to various independent detectors. A voice data detector 11 detects whether the data packets coming from the data source 5 contain voice data. A video data detector 12 detects whether the data packets coming from the data source 5 contain image data. As soon as the voice data detector 11 identifies that the data packets contain voice data it outputs an appropriate indicator signal (Event Voice) to the flow controller 1. When the video data detector 12 identifies that the incoming data packets contain image data it likewise outputs an appropriate indicator signal (Event Video) to the flow controller 1.

The voice data detector 11 and the video data detector 12 evaluate the header data or data packet management data from the incoming data packets. In one preferred embodiment, the traffic type VOICE or the traffic type VIDEO is identified by checking the TCP or UDP port number for the data service used in the respective network.

Besides the voice data detector 11 and the video data detector 12, the flow controller 1 is additionally connected to an impulse noise detector 13 and to a connection quality detector 14.

The detector 13 for detecting pulsed noise detects impulse noise sources which briefly subject the transmission medium to a noise signal and whose level is significantly above the level of the useful signal and hence makes reception of the useful signal impossible for a short time. Such pulsed noise signals normally last no longer than 2 msec. The safety margin, normally present for a DSL line, between the fixed noise level and the signal level of typically 6 to 30 dB does not provide adequate protection against pulsed noise signals.

In one preferred embodiment, the pulsed noise signal is identified through continuous observation of the signal-to-noise ratio SNR at the reception end of the xDSL modem.

In one alternative embodiment, CRC errors which arise are detected.

In another alternative embodiment, a pulsed noise signal is detected by evaluating not only the number of CRC errors which arise but also, in addition, the results of the Reed-Solomon decoder provided at the reception end, i.e. the number of successfully corrected and uncorrected RS code words.

The connection quality detector 14 is used to detect the connection quality of the DSL link. To this end, the signal-to-noise ratio SNR is continually monitored and an average signal-to-noise ratio SNR is calculated, for example. If the calculated average is above a prescribed threshold value, the connection quality is rated as adequate. If the average is below the prescribed value, on the other hand, the connection quality detector 14 outputs an indicator signal which indicates a poor connection to the flow controller 1.

In alternative embodiments of the connection quality detector 14, coefficients as summarized in RFC2662, Definitions of Managed Objects for the ADSL Lines, IETF, August 1999, for example, are used. By way of example, "adslAtucPerfEss" or "adslAtucPerfEss" is monitored to determine whether the count has increased by more than 3, for example, within a time interval of preferably 60 sec. If this is the case, the connection quality detector 14 outputs an indicator signal Event Link Bad to the flow controller 1, indicating that the connection quality is inadequate.

The flow controller 1 takes the data traffic type detected using the detectors 11, 12 as a basis for dynamically adjusting the data transmission rate of the xDSL modem 2. To this end, the flow controller 1 outputs control signals to an internal modem controller 2a provided within the xDSL modem 2. The flow controller 1 controls the maximum transmission rate of the two latency paths contained in the dual latency xDSL modem (Max Link Rate LP0/1), a minimum transmission rate for the two latency paths LP0, LP1 (Min Link Rate 0/1), a maximum permissible signal delay via the two latency paths LP0/LP1 (Max Link Delay 0/1) and a minimum immunity toward pulsed noise signals for the two latency paths Min Link INP0/1. In addition, the flow controller 1 outputs three control signals SRA (Seamless Rate Adaptation), DRR (Dynamic Rate Repartitioning) and SIC (Seamless Interleaver Change) to the internal modem controller 2a. The internal modem controller 2a actuates the internal latency paths LP within the xDSL modem 2.

In the case of SAR, there is a dynamic change in the number of bits per unit time which pass through a QAM modulator in the transmitted-signal path of the xDSL modem, i.e. dynamic data rate adjustment takes place. This also entails settings being changed in a framer and in a Reed-Solomon encoder connected downstream thereof.

In the case of DRR (Dynamic Rate Repartitioning), a data rate is dynamically distributed between the two latency signal paths LP0/LP1 within the xDSL modem. The total rate, i.e. the sum of the two data transmission rates, remains unchanged in this case, and only the splitting ratio is changed. In this case, the framer and the Reed-Solomon encoder may also be set as appropriate.

In the case of SIC (Seamless Interleave Change), there is a dynamic alteration in the interleave depth of the interleaver INT provided in the respective latency signal path LP. The international standards for ADSL and VDSL support SRA, DRR and SIC to different extents in line with the table below:

| ITU-T Standard | SRA | DRR | SIC |
| --- | --- | --- | --- |
| G.992.1, 2 | No | No | No |
| G.922.3, 5 | Yes | Yes | No |
| G.993.1 | No | No | No |
| G.993.2 | Yes | Yes | Yes |

In one preferred embodiment, the inventive flow controller 1 distinguishes between three different traffic types, namely a Data traffic type VT_Data for web browsing, e-mails, FTP etc., a Voice traffic type VT_Voice for Voice over IP applications and a Video traffic type VT_Video for image data applications.

For each traffic type, the network operator specifies configuration parameters a priori, particularly the maximum transmission rate for each traffic type, the minimum data transmission rate for each traffic type and the maximum permissible delay time for the two traffic types Data and Voice. Also, the permissible impulse noise duration for the traffic type Video is prescribed. The configuration parameters are stored in the configuration memory 10 shown in FIG. 1 and can be read by the flow controller 1.

Typical configuration parameter values are:

|  | Data | Voice | Video |
| --- | --- | --- | --- |
| MaxRate | 24 Mbit/s | 256 kbit/s | 15 Mbit/s |
| Min_Rate | 128 kbit/s | 100 kbit/s | 8 Mbit/s |
| MaxDelay | 8 ms | 5 ms | — |
| MinINP | — | — | 2 ms |

Besides the configuration parameters which have been read, the flow controller 1 receives indicator signals or events from the detectors 11, 12, 13, 14. The event EVTHINP indicates that pulsed noise has been identified by the impulse noise detector 13. The event Event Link Bad indicates that connection quality detector 14 has identified a deterioration in the connection quality. The event Event Voice indicates that the voice data detector 11 has identified that the data traffic contains voice data. The event EVT VIDEO indicates that the video data detector 12 has identified that the data traffic contains video data.

In addition, the flow controller 1 receives connection parameters from the dual latency xDSL modem 2 via lines 15, namely the delay for the two latency paths which has actually been caused by interleaving (Link Delay LP0/Link Delay LP1), the maximum repair time for protecting against impulse noise for the two latency paths (Link INP LP0, Link INP LP1), and the actual data rate for the two latency paths 0,1 (Link Rate LP0, Link Rate LP1).

As can be seen from FIG. 2, each transmitted-signal path or latency path has a framer for grouping the data into an xDSL frame and also an associated error protection unit. The error protection unit comprises, in particular, a CRC encoder for generating a test digit, a scrambler for scrambling the data which are to be transmitted, including the generated test digit, and also a Reed-Solomon encoder RS. The error protection unit has a respective interleaver INT connected downstream of it which interleaves the encoded data. The interleave depth of the interleavers can in this case preferably be set differently for the different latency paths LP. Interleaving the information or distributing it in the course of time results in additional protection against noise signals. However, interleaving results in an additional signal propagation time. Typically, "Interleaving Delay" values of between 8 and 20 msec. are required in order to achieve adequate protection against impulse noise. The interleaved data are then associated with various carrier frequencies and are modulated by a QAM modulator. Next, inverse Fourier transformation, digital-analog conversion and pulse shaping using filters are carried out. Between the transmission and reception directions there is a hybrid circuit with echo cancellation EC.

The detectors 11, 12, 13, 14 are used for continuously observing the data traffic for the occurrence of voice data, video data and for monitoring the physical connection for impulse noise and the general quality of the connection. On the basis of the results of these observations, the flow controller 1 performs dynamic adjustment of the data rate and also of the connection parameters relating to the protection against impulse noise. The classified data traffic is allocated transmission paths within the modem, which meets the previously specified requirements of the data traffic. As a result of the dynamic adjustment of the connection parameters, i.e. without clearing down or setting up a connection again, the flow controller 1 ensures a continually optimum connection quality for the various traffic types. In this case, only the currently required part of the power spectrum is used within a cable bundle, which means that the total throughput in the cable bundle is maximized.

FIG. 3 shows a flowchart of a preferred embodiment of the inventive method.

After a start step S0, the flow controller 1 is first of all used to initialize the xDSL modem 2 in a step S1. In this case, the data transmission rate of the xDSL modem 2 is initialized to a prescribed minimum transmission rate for transmitting data of the data traffic type. Following the initialization step S1, a counter or a timer T1 is started in step S2.

In a step S3, a check is first of all performed to determine whether or not the incoming data packets contain voice data. If this is the case then a subroutine A, as shown in FIG. 4, is executed in step S4.

Figure 5B:
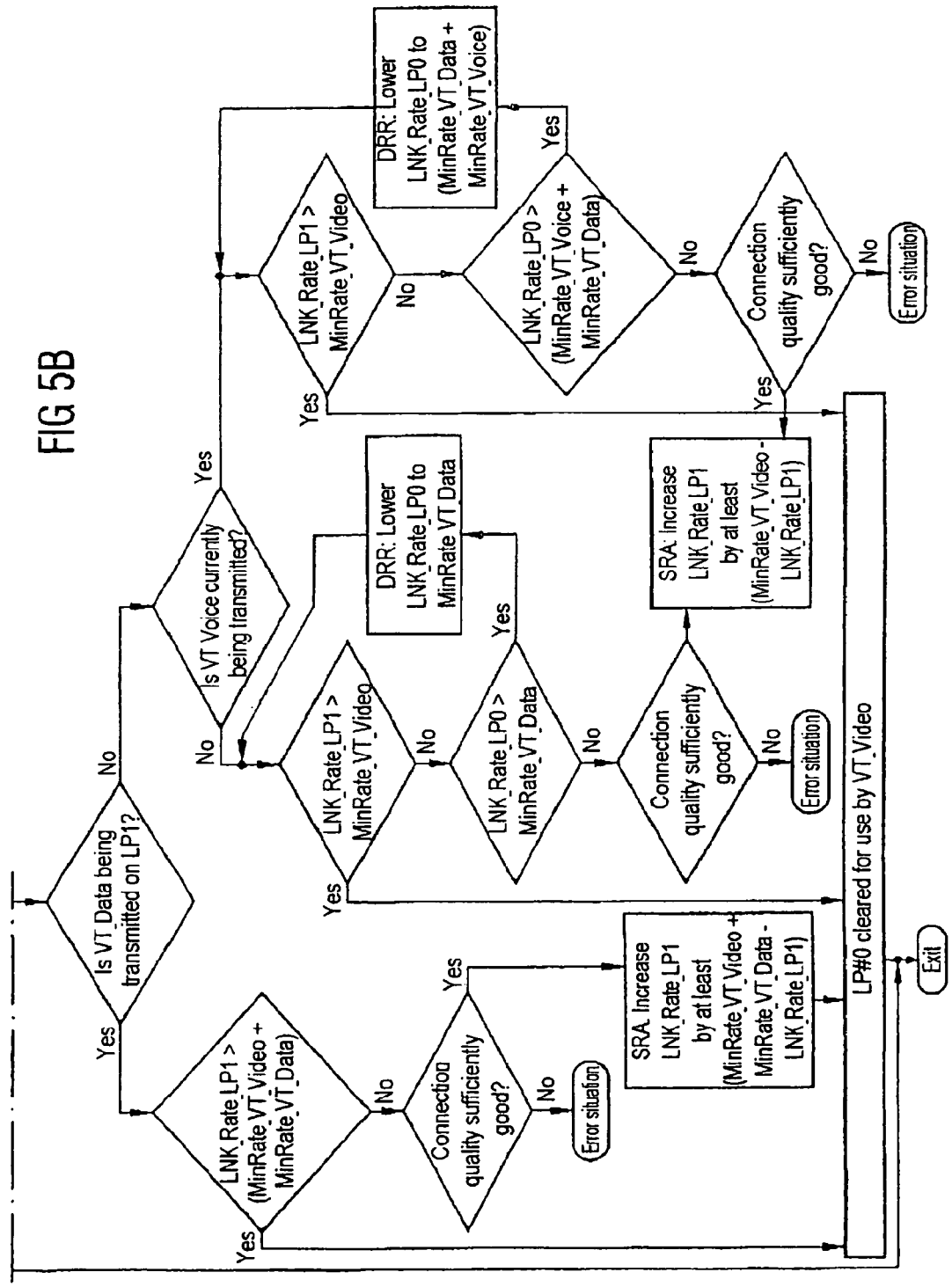
FIG. 5 is a flowchart of a further subroutine within the inventive method shown in FIG. 3.

If the incoming data packets do not contain voice data, the process is continued directly with step S5, i.e. the flow controller 1 checks whether the video data detector 12 has identified the presence of image data. If the incoming data packets contain image data then the subroutine B, shown in FIG. 5, is executed in step S6.

Figure 6:
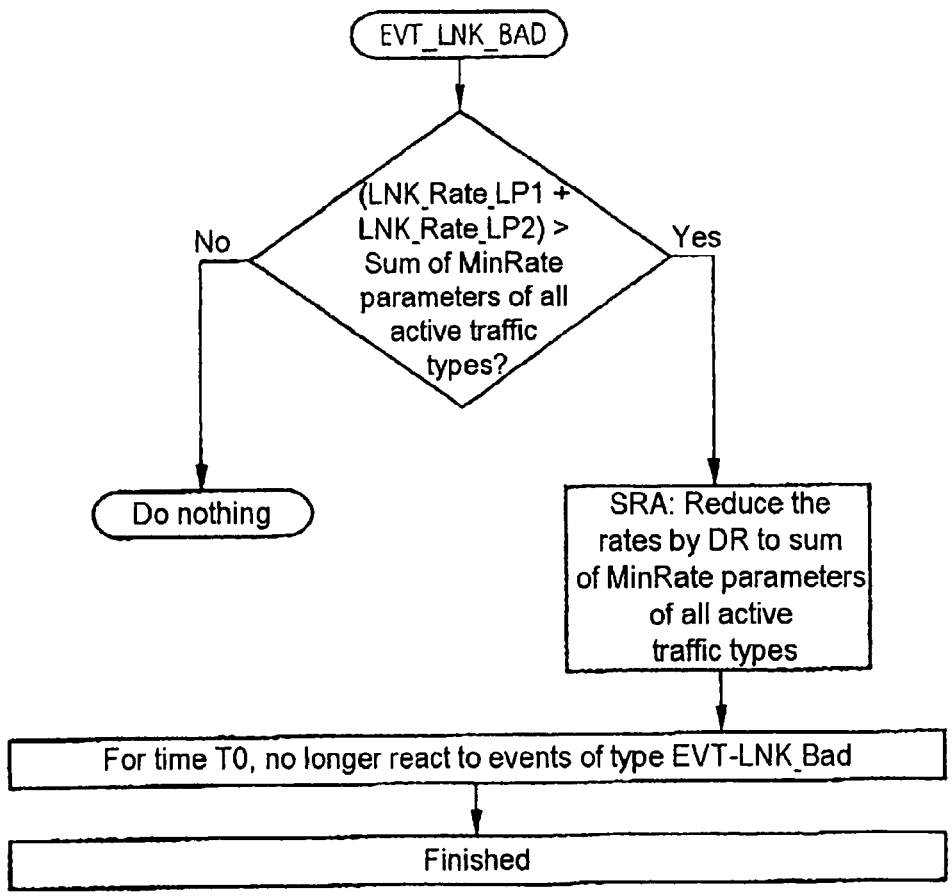
FIG. 6 is a flowchart of a further subroutine within the inventive method shown in FIG. 3.

In step S7, the flow controller checks whether the connection quality stipulated by the detector 14 is adequate. If the connection quality is not adequate, the counter T1 is reset in step S8 and a subroutine C, shown in FIG. 6, is executed in step S9.

In step S10, the flow controller 1 checks whether the impulse noise detector 13 is reporting impulse noise. If impulse noise is present then the counter is reset and started in step S11. Next, a subroutine D, as shown in FIG. 7, is executed in step S12.

In step S13, the flow controller 1 checks whether or not the counter T1 has expired. If the counter has expired then the data rate of the xDSL modem 2 is increased by means of SRA in step S14. Next, the counter T1 is reset again and is restarted in step S15. The process then returns to step S3.

In the inventive method, as shown in FIG. 3, the data transmission rate of the xDSL modem 2 is first of all set to a prescribed minimum transmission rate for transmitting the "Data" traffic type in the initialization step S1. As soon as the DSL connection has been set up and hence the fundamental capability of the xDSL modem to transmit the sum of all minimum required data rates is assured, the flow controller 1 to this end reduces the data rate on the DSL line using the SRA mechanism by the minimum rates for the two traffic types "Voice" and "Video", so that only the minimum required data transmission rate for the "Data" traffic type is left. The additionally required data transmission rates for voice and video are provided dynamically via the flow controller 1 only upon the actual occurrence of voice and video data traffic. The data transmission rate or the bandwidth for the "Data" traffic type is provided permanently by the flow controller 1. The flow controller 1 first of all ensures that the transmission channel meets the minimum requirements by training the DSL connection with the sum of the minimum data transmission rate for all traffic types. So that unnecessary signal spectra are not used up, the flow controller 1 then reduces the data transmission rate to the minimum data transmission rate for the "Data" traffic type in initialization step S1.

The flow controller 1 then uses the voice data detector 11 and the video data detector 12 to monitor whether data of at least one further traffic type are transmitted. The data transmission rate of the xDSL modem 2 is set to a prescribed minimum total data rate for transmitting data of the data traffic type and data of the other detected traffic type if other traffic types, for example voice or video data, are detected by means of the detectors 11, 12. This dynamic adjustment of the data transmission rates as required, i.e. when another traffic type arises, is effected by means of the subroutines A, B in steps S4, S6.

If, in step S7, the connection quality detector 14 identifies that the line conditions have deteriorated then the flow controller 1 checks whether a higher data rate is set than is required as a minimum. To this end, the flow controller 1 checks whether the data transmission rate is higher than the sum of the minimum required data transmission rates of all active traffic types. If this is the case then the data transmission rate of the xDSL modem is reduced in steps by the flow controller 1 using SRA. If it is not possible to reduce the data transmission rate, the physical limits have been reached and the xDSL modem 2 automatically clears down the xDSL connection completely on account of the bit errors which are beginning. The reduction in the data transmission rate for the case of poor connection quality is the opposite of step S14, in which the data transmission rate is increased at regular intervals of time. So to speak, the data transmission rate "breathes" with the prevailing connection quality.

If the detector 13 for impulse noise reports to the flow controller 1 the occurrence of impulse noise and if, at the same time, the "Video" traffic type is active, i.e. if guaranteed protection against impulse noise sources is required, then the flow controller 1 first of all attempts to increase the signal propagation time to the highest permitted value using SIC. If this is not possible, for example because the signal propagation time has already reached the maximum permissible value, then the data transmission rate is reduced to the minimum required value. If this is not possible either then the flow controller 1 uses the SRA mechanism to increase the gross data rate on the subscriber line and to use the data rate gain in this case to add further forward error correction data. In this case, the flow controller 1 makes use of the fact that longer signal propagation times result in longer "smearing" of the data through interleaving and hence also in greater protection against noise impulses. Accordingly, lowering the data rate by increasing the signal-to-noise ratio SNR means a greater probability that noise impulses will not exceed their safety margin. In the case of the forward error correction, K data bytes are always combined with R check bytes. In all DSL systems, the sum comprising the K data byte and the R check bytes is less than or equal to 255. When R is large and k is small, protection against impulse noise can be improved by reducing the number K of data bytes and increasing the number R of check bytes.

Using the timer or counter mechanism T1, the flow controller 1 based on the invention sets the data transmission rate of the xDSL modem 2 to a higher data transmission rate in steps. If a plurality of data transmission systems are operating simultaneously which share a cable bundle containing a large number of subscriber lines 3, the distribution of the total bundle capacity is fairer than when the respective modems are always set just to a fixed data transmission rate.

The inventive flow controller 1 initially sets the data transmission rate to the minimum transmission rate for transmitting the "Data" traffic type. If none of the events which are checked by means of steps S3, S5, S7, S10 occurs, the data transmission rate is increased in steps at regular intervals of time in step S14. As a result, the available transmission channel is used only to the extent that is currently needed, so that the crosstalk occurring on the adjacent data transmission channels is as low as possible. This optimizes the overall use of the channel bundle.

Following the initialization step S1, the flow controller 1 starts to poll the individual detectors 11, 12, 13, 14 continuously. If the voice data detector 11 is used to detect the occurrence of voice data packets (Voice Over IP) then the flow controller 1 provides additional bandwidth for voice data using SRA in step S4.

If the video data detector 12 identifies the occurrence of video data packets then the flow controller 1 first of all checks whether there is sufficient bandwidth available, so that the minimum required data transmission rates are provided for all active traffic types. If this is the case then the flow controller 1 takes no further measures. If there is not sufficient bandwidth available then the flow controller 1 requests the missing data transmission rate from the xDSL modem 2 using the SRA mechanism.

Various steps in the inventive method shown in FIG. 3 are described in detail below.

In step S1, the xDSL modem 2 is initialized by the flow controller 1. This involves the initialization being effected on the basis of whether the xDSL modem 2 is a dual latency xDSL modem having two latency signal paths LP0, LP1 or an xDSL modem having just one latency path LP0.

If the xDSL modem is a modem having just one latency path LP then the data transmission rate is chosen such that:

$$LNK\_RATE\_LP0 = MinRate\_VT\_Data + MinRate\_VT\_Voice + MinRate\_VT\_Video. \quad (1)$$

In addition, the maximum interleaving delay is set by the flow controller as follows:

$$LNK\_DELAY\_LP0 <= Min(MaxDelay\_VT\_Data, MaxDelay\_VT\_Voice). \quad (2)$$

In this context, the shortest possible signal delay is chosen which still meets the requirement.

In addition, the flow controller 1 sets the framing parameter as follows:

$$MIN\_LNK\_INP\_LP0 >= MinINP\_VT\_Video. \quad (3)$$

If there is a conflict between the two above requirements (2), (3) then the flow controller 1 proceeds such that for the maximum interleaving delay:

$$LNK\_DELAY\_LP0 <= MaxDelay\_VT\_Data \quad (4)$$

with the smallest possible delay being chosen for which the requirement is still met.

In addition, the framing parameter is set such that:

$$LNK\_INP\_LP0 >= MinInp\_VT\_Video \quad (5)$$

If requirements (2) and (3) are in conflict with one another then the flow controller 1 first of all ignores the signal delay requirement for voice data, assuming that the interleaving delay is dynamically reduced for later phases with voice communication.

In addition, the data paths are connected by the flow controller 1 such that all three traffic types are put onto the latency path LP0.

Following successful connection setup, the data transmission rate for the latency path LP0 is reduced by (MinRate_VT_Voice+MinRate_VT_Video) by the flow controller using SRA.

This concludes the initialization in step S1 of the xDSL modem 2.

If the xDSL modem 2 has two separate latency paths LP0, LP1, the initialization in step S1 by the flow controller 1 takes place as follows.

If MaxDelay_VT_Data<=MaxDelay_VT_Voice, the data transmission rate for the latency path LP0 is chosen such that:

$$LNK\_RATE\_LP0 = MinRate\_VT\_Data + MinRate\_VT\_Voice. \quad (6)$$

Next, the maximum interleaving delay by the latency path LP0 is set by the flow controller 1 such that:

$$LNK\_DELAY\_LP0 <= MaxDelay\_VT\_Data. \quad (7)$$

The data transmission rate for the latency path LP1 is then set by the flow controller 1 such that $$LNK\_RATE\_LP1 = MinRate\_VT\_Video. \quad (8)$$

The flow controller 1 then sets the framing parameter for the latency path LP1 such that:

$$LNK\_INP\_LP1 >= MinINP\_VT\_Video. \quad (9)$$

The data paths are then connected such that the "Voice" traffic type VT_Voice and the "Data" traffic type VT_Data are transmitted on the signal path LP0.

In addition, the data paths are connected by the flow controller 1 such that the "Image Data" traffic type VT_Video is put onto the latency path LP1 of the dual latency modem 2.

Immediately after successful connection setup by the xDSL modem, the data transmission rate for the latency path LP0 LNK_Rate_LP0 is reduced by MinRate_VT_Voice by the flow controller 1 using SRA/DRR. The transmission rate for the latency path LP1 LNK_Rate_LP1 is reduced by MinRate_VT_Video by the flow controller 1 using SRA/DRR.

If MaxDelay_VT_Data>MaxDelay_VT_Voice then the latency path LP0 is used for voice and the latency path LP1 is used for video and data.

The flow controller then sets the data rate for the latency path LP0 such that:

$$LNK\_RATE\_LP0 = MinRate\_VT\_Voice. \quad (10)$$

The maximum interleaving delay for the latency path LP0 is then set such that:

$$LNK\_DELAY\_LP0 <= MaxDelay\_VT\_Voice. \quad (11)$$

Next, the data rate for the latency path LP1 is set by the flow controller 1 such that:

$$LNK\_RATE\_LP1 = MinRate\_VT\_Video + MinRate\_VT\_Data. \quad (12)$$

Next, the maximum interleaving delay for LP1 is set by the flow controller 1 such that:

$$LNK\_DELAY\_LP1 = MaxDelay\_VT\_Data. \quad (13)$$

The framing parameters are set by the flow controller 1 for the latency path LP1 such that:

$$LNK\_INP\_LP1 >= MinINP\_VT\_Video. \quad (14)$$

Finally, the data paths are connected by the flow controller 1 such that the traffic type VT_Voice is put onto the latency path LP0 and the traffic types VT_Data and VT_Video are put onto the latency path LP1.

Immediately after successful connection setup, the data transmission rate for the latency path LP0 (LNK_RATE_LP0) is reduced by MinRate_VT_Voice by the flow controller 1 using SRA/DRR. The data transmission rate for the latency path LP1 (LNK_RATE_LP1) is reduced by MinRate_VT_Video by the flow controller 1 using SRA/DRR.

This concludes the initialization of the dual latency xDSL modem 2 in step S1.

When the counter T1 has started in step S2, the flow controller 1 monitors various events using the detectors 11, 12, 13, 14 in steps S3, S5, S7, S10.

In step S14, the expiry of the counter T1 results in the data rate being increased in steps using SRA until the sum of the respective permissible values for all active traffic types has been reached. When a poor connection or a pulsed noise signal occurs, the counter T1 is reset, i.e. increasing the data rate is not continued if the line quality deteriorates. As a result, the xDSL modem 2 only ever outputs as much power to the subscriber line 3 as is required for the respective data traffic situation. Hence, the capacity available in a cable bundle containing a large number of lines is utilized in optimum fashion. The inventive flow controller 1 therefore carries out dynamic spectrum management.

If the xDSL modem 2 is a dual latency modem then during initialization by the flow controller 2 the "Voice" traffic type is combined with that of the other two traffic types in a latency path LP, which has a lower propagation time requirement than voice. The comparison for the shorter propagation time is preferably made only with the "Data" traffic type, since in practice video data always have a longer permissible propagation time than voice data. If there is not a lower propagation time requirement than for the "Voice" traffic type for the data traffic then a latency path LP is reserved exclusively for voice data transmission, and the video and data traffic share the other latency path.

In the case of a dual latency xDSL modem, the data rates are chosen by the flow controller 1 for each latency path such that the sum of the minimum data transmission rates corresponds to the respective traffic types provided. The maximum permissible propagation time is chosen such that the most stringent of all the propagation time requirements of the respectively provided traffic types is met. That latency path LP which is transmitting video data is configured in line with the requirement for minimum protection against impulse noise sources.

As soon as the connection has been set up and hence the fundamental capability of the xDSL modem 2 to transmit the sum of all minimum required data transmission rates is assured, the flow controller 1 reduces the data transmission rate on the DSL line 3 using the SRA mechanism by the minimum rates for voice and video in the respective latency path LP, so that only the minimum required rate for data traffic is left. The DRR mechanism is then used to associate the entire data transmission rate with that latency path which is transmitting data traffic, while the other latency path is reduced to a data rate of 0. The additionally required data transmission rates for voice and video are provided dynamically by the flow controller 1 only upon an actual occurrence of voice or video traffic. By contrast, the bandwidth for data is provided by the flow controller 1 permanently.

The inventive flow controller 1 is based on the following practical requirements, namely:

In principle, a sufficiently high data transmission rate needs to be provided for simultaneous transmission of all three traffic types on the respective transmission channel.

The required, maximum data transmission rate of the "Data" traffic type is much higher than the data transmission rate for the "Voice" traffic type.

The required maximum data transmission rate for the "Video" traffic type is much higher than the data transmission rate for the "Voice" traffic type.

A transmission option for the "Data" traffic type is provided by the flow controller 1 permanently.

For the transmission of video and voice data, a minimum data transmission rate must not be undershot.

For the transmission of voice data, a maximum propagation time must not be exceeded.

For the transmission of video data, a minimum level of security against impulse noise is assured by the flow controller 1.

In this context, the observance of the minimum propagation time for voice data is rated more importantly than the fulfillment of the minimum level of security against impulse noise in the case of video data transmission.

The transmission system is set to either one or two data transmission paths or latency paths from the outset.

Video and voice data are not transmitted permanently, but rather only when required.

The inventive flow controller 1 allows the data transmission rate for the "Data" traffic type to fluctuate, since this is not a problem.

The inventive arrangement, as shown in FIG. 1, is preferably used at the exchange end, i.e. by the network operator. The data source 5 represents a packet-based transport network belonging to the network operator, including the gateway to the Internet.

The inventive method has been described by way of example with reference to three traffic types, namely. "Data", "Voice", and "Video". In an alternative embodiment, data streams of these and other traffic types are controlled.

What is claimed is:

1. A method for transmitting data of various traffic types utilizing an xDSL modem comprising:
    detecting the traffic types of the data which are to be transmitted,
    setting a data transmission rate by a flow controller, and
    dynamically adjusting a data transmission rate for the xDSL modem based on the detected traffic types.

2. The method of claim 1, further comprising:
    initializing a data transmission rate for the xDSL modem to a prescribed minimum transmission rate for transmitting data of a data traffic type;

detecting whether data of at least one other traffic type needs to be transmitted by the xDSL modem, and setting the data transmission rate to a prescribed minimum total data rate for transmitting data of the data traffic type and data of the further detected traffic types;

increasing the set data transmission rate in steps at prescribed intervals of time; and reducing the set data transmission rate to the minimum total data rate if a deterioration in connection quality is detected.

3. The method of claim 2, wherein the various traffic types comprise a data traffic type for transmitting data, a voice traffic type for transmitting voice data, and a video traffic type for transmitting image data.

4. The method of claim 1, wherein the flow controller sets the data rate using a data transmission rate algorithm.

5. The method of claim 4, wherein the data transmission rate algorithm utilizes Seamless Rate Adaptation.

6. The method of claim 1, wherein a voice data detector connected to the flow controller is used to detect whether data packets coming from a data source comprise voice data or image data.

7. The method of claim 1, further comprising distributing the data to be transmitted over various transmitted-signal paths for the xDSL modem by a time-division demultiplexer.

8. The method of claim 1, wherein a test digit for the data which are to be transmitted is generated by a CRC encoder.

9. The method of claim 8, wherein the data to be transmitted, including the generated test digit, are scrambled by a scrambler.

10. The method of claim 9, wherein the scrambled data are encoded by a Reed-Solomon encoder.

11. The method of claim 10, wherein the data encoded by the Reed-Solomon encoder are interleaved by an interleaver having an adjustable interleaver depth.

12. An apparatus for transmitting data of various traffic types utilizing an xDSL modem, comprising:

at least one detector used to detect at least one traffic type of data which is to be transmitted, wherein the detected traffic type can be taken as a basis for dynamically adjusting a data transmission rate for the xDSL modem, and a flow controller, wherein the data transmission rate of the xDSL modem can be set by the flow controller utilizing Seamless Rate Adaptation.

13. The apparatus of claim 12, further comprising:

a device for initializing a data transmission rate for the xDSL modem to a prescribed minimum transmission rate for transmitting data of a data traffic type;

a device for detecting whether data of at least one other traffic type needs to be transmitted by the xDSL modem, and for setting the data transmission rate to a prescribed minimum total data rate for transmitting data of the data traffic type and data of the further detected traffic types;

a device for increasing the set data transmission rate in steps at prescribed intervals of time; and a device for reducing the set data transmission rate to the minimum total data rate if a deterioration in connection quality is detected.

14. The apparatus of claim 13, wherein the various traffic types comprise a data traffic type for transmitting data, a voice traffic type for transmitting voice data, and a video traffic type for transmitting image data.

15. The apparatus of claim 12, wherein a voice data detector connected to the flow controller can be used to detect whether data packets coming from a data source contain voice data.

16. The apparatus of claim 12, wherein a video data detector connected to the flow controller can be used to detect whether data packets coming from a data source comprise image data.

17. The apparatus of claim 12, wherein the data to be transmitted can be distributed over various transmitted-signal paths for the xDSL modem by a time-division demultiplexer.

18. The apparatus of claim 17, wherein the distributed data in each transmitted-signal path can be grouped by a framer to form a frame.

19. The apparatus of claim 18, wherein the data to be transmitted which are grouped in a frame on each transmitted-signal path can be encoded by an associated error protection device in order to protect against transmission noise.

* * * * *